(12) United States Patent
Yoshinaga et al.

(10) Patent No.: US 11,557,431 B2
(45) Date of Patent: Jan. 17, 2023

(54) MOTOR

(71) Applicant: TOYOTA JIDOSHA KABUSHIKI KAISHA, Toyota (JP)

(72) Inventors: Fumitaka Yoshinaga, Toyota (JP); Akira Yamashita, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 106 days.

(21) Appl. No.: 16/853,002

(22) Filed: Apr. 20, 2020

(65) Prior Publication Data

US 2020/0343041 A1 Oct. 29, 2020

(30) Foreign Application Priority Data

Apr. 25, 2019 (JP) .............................. JP2019-083618

(51) Int. Cl.
| | |
|---|---|
| *H02K 15/00* | (2006.01) |
| *H01F 41/02* | (2006.01) |
| *H02K 1/14* | (2006.01) |
| *H02K 3/18* | (2006.01) |
| *H02K 15/03* | (2006.01) |
| *H02K 1/18* | (2006.01) |

(52) U.S. Cl.
CPC ........... *H01F 41/024* (2013.01); *H02K 1/148* (2013.01); *H02K 1/18* (2013.01); *H02K 3/18* (2013.01); *H02K 15/03* (2013.01); *Y10T 29/53143* (2015.01)

(58) Field of Classification Search
CPC ...... H02K 5/225; H02K 5/1672; H02K 16/04; H02K 1/185; H02K 2203/12; H02K 47/20; Y10T 29/53143; Y10T 29/49009; Y10T 29/49208; H01R 2201/10
USPC .......... 29/732, 596, 598, 606, 729, 787, 795
See application file for complete search history.

(56) References Cited

U.S. PATENT DOCUMENTS

| | | | |
|---|---|---|---|
| 10,090,720 B2 * | 10/2018 | Büttner | ................. H02K 1/246 |
| 10,862,354 B2 * | 12/2020 | Nishikawa | ........... C21D 8/1211 |
| 2008/0231138 A1 | 9/2008 | Onimaru et al. | |
| 2017/0229930 A1 | 8/2017 | Makino et al. | |

FOREIGN PATENT DOCUMENTS

| | | |
|---|---|---|
| CN | 102545415 A | 7/2012 |
| JP | 2003-324861 A | 11/2003 |
| JP | 2008-236918 A | 10/2008 |

(Continued)

*Primary Examiner* — Thiem D Phan
(74) *Attorney, Agent, or Firm* — Sughrue Mion, PLLC (57) ABSTRACT

Provided is a motor capable of having an improved output while keeping the mechanical strength of the stator core. A motor includes: a stator including a stator core including an annular yoke having an outer part and an inner part and teeth extending inwardly from the inner part of the yoke, and a coil wound around the teeth; and a rotor rotatably disposed inside of the stator. The stator core includes the lamination of sheet members made of a soft magnetic material. Each sheet member has a binding part to bind the sheet members in the lamination at a first part corresponding to the outer part of the yoke. At least the binding part of the first part is made of an amorphous soft magnetic material. The sheet member has a second part other than the first part, and the second part is made of a nanocrystal soft magnetic material.

4 Claims, 10 Drawing Sheets

(56) References Cited

FOREIGN PATENT DOCUMENTS

| JP | 2008-259349 A | 10/2008 |
| JP | 2012-050200 A | 3/2012 |
| JP | 2017-099157 A | 6/2017 |
| JP | 2017-143251 A | 8/2017 |

* cited by examiner

MOTOR

CROSS REFERENCE TO RELATED APPLICATIONS

The present application claims priority from Japanese patent application JP2019-083618 filed on Apr. 25, 2019, the content of which is hereby incorporated by reference into this application.

BACKGROUND

Technical Field

The present disclosure relates to a motor including a stator having a coil wound around a stator core, and a rotor rotatably disposed inside of the stator, and a method for manufacturing such a motor.

Background Art

Cores for conventional motors and transformers include the lamination of a plurality of plates made of an amorphous soft magnetic material. These plates in the lamination are bound with a holding member or a fastener (e.g., see JP 2008-236918 A).

SUMMARY

The core described in JP 2008-236918 A, however, is made of an amorphous soft magnetic material and so has low saturated magnetization. A motor including such a core may deteriorate in motor torque. To avoid this, the amorphous soft magnetic material may be heated for crystallization to increase the saturated magnetization of the core. Such a core, however, deteriorates in mechanical strength. When sheet members made of such a crystallized material are stacked to be a lamination for a stator core, for example, these sheet members may be damaged, because the binding part of the stacked sheet members is receptive to stress during manufacturing and in use.

In view of such a problem, the present disclosure provides a motor capable of having an improved output while keeping the mechanical strength of the stator core stably, and provides a method for manufacturing such a motor stably.

In view of the above problems, a motor according to the present disclosure includes: a stator including a stator core including an annular yoke having an outer part and an inner part and teeth extending inwardly from the inner part of the yoke, and a coil wound around the teeth; and a rotor rotatably disposed inside of the stator. The stator core includes a lamination of a plurality of sheet members made of a soft magnetic material. Each of the sheet members has a binding part to bind the sheet members in the lamination at a first part corresponding to the outer part of the yoke. At least the binding part of the first part is made of an amorphous soft magnetic material. The sheet member has a second part other than the first part, the second part being made of a nanocrystal soft magnetic material.

The stator core according to the present disclosure includes the lamination of a plurality of sheet members. The binding part that binds these sheet members is receptive to stress, such as thermal stress, during the operation of the motor. The binding part of the present disclosure is made of an amorphous soft magnetic material that has a higher mechanical strength than that of a nanocrystal soft magnetic material, and in the case of concentration of stress on the binding part, if any, this configuration prevents a breakage originating from the binding part.

The first part having the binding part corresponds to the outer part of the yoke, and the second part is a part of the sheet member other than the first part, and so corresponds to the inner part of the yoke and the teeth to form a magnetic path during the operation of the motor. The second part of the present disclosure is made of a nanocrystal soft magnetic material having higher saturated magnetization than that of an amorphous soft magnetic material, and so the output characteristics of the motor improve.

While the binding part of the first part is made of an amorphous soft magnetic material, the other part of the first part may be made of any one of an amorphous soft magnetic material and a nanocrystal soft magnetic material. In some embodiments, the first part is made of an amorphous soft magnetic material.

According to this aspect, the first part having the binding part corresponds to the outer part of the yoke, and this first part is made of an amorphous soft magnetic material. This means that the strong material is disposed at the outer part of the annular stator core, and this increases the rigidity of the stator core.

The binding part binds the sheet members in the lamination. In one example, this binding part may bind the sheet members with a fastening member, for example, and the present disclosure does not especially limit the mode of the binding part. In some embodiments, each of the sheet members has a recess on one face, the binding part is a protrusion on the other face defined with the recess, and the protrusion of each sheet member fits into the recess of the adjacent sheet member.

The protrusion as the binding part of each sheet member fits into the recess of the adjacent sheet member, and such a protrusion is receptive to stress. In the case of concentration of such stress on the binding part, if any, this aspect prevents a damage of the protrusion, because the protrusion (binding part) is made of an amorphous soft magnetic material having a higher mechanical strength than that of the a nanocrystal soft magnetic material.

In some embodiments, the thickness of the sheet members is 0.01 mm or more and 0.05 mm or less. According to this aspect, the sheet members of the stator core having a thickness within such a range also keep the mechanical strength of the stator core, and suppress iron loss of the stator core as well.

A method for manufacturing a motor according to the present disclosure manufactures a motor including: a stator including stator core including an annular yoke having an outer part and an inner part and teeth extending inwardly from the inner part of the yoke, and a coil wound around the teeth; and a rotor rotatably disposed inside of the stator, the stator core including a lamination of a plurality of sheet members made of a soft magnetic material. The method includes: preparing the sheet members made of an amorphous soft magnetic material and each having a shape corresponding to a shape of the stator core; setting a binding part to bind the sheet members in the lamination at a first part of each of the prepared sheet members, the first part corresponding to the outer part of the yoke, and heating at least a second part other than the first part of the sheet member while keeping the amorphous soft magnetic material of at least the binding part so as to crystallize at least the second part from the amorphous soft magnetic material into a nanocrystal soft magnetic material; and stacking the crystallized sheet members and binding the sheet members at the binding part of the stacked sheet members.

The manufacturing method of the present disclosure stacks the plurality of sheet members as the stator core, and binds the sheet members with the binding part at the binding step. Although such a binding part is receptive to stress, the crystallization step of the present disclosure keeps the amorphous soft magnetic material of the binding part that has a higher mechanical strength than that of a nanocrystal soft magnetic material. This prevents a damage of the sheet members during the binding step to bind the sheet members with the binding part.

The first part having the binding part corresponds to the outer part of the yoke, and the second part is a part of the sheet member other than the first part, and so corresponds to the inner part of the yoke and the teeth to form a magnetic path during the operation of the motor. The crystallization step of the present disclosure heats the second part of each sheet member to crystallize this part from the amorphous soft magnetic material to a nanocrystal soft magnetic material. The second part therefore is made of a nanocrystal soft magnetic material having higher saturated magnetization than that of an amorphous soft magnetic material, and so the output characteristics of the motor improve.

The crystallization step may keep a part of the first part other than the binding part as the amorphous soft magnetic material or may crystallize this part into a nanocrystal soft magnetic material, as long as the binding part of the first part is kept as the amorphous soft magnetic material. In some embodiments, the crystallization step heats the second part to keep the amorphous soft magnetic material of the first part.

This means that the first part having the binding part corresponds to the outer part of the yoke, and this first part is made of an amorphous soft magnetic material. The strong material is disposed at the outer part of the annular stator core, and this increases the rigidity of the stator core.

At the binding step, the binding part binds the sheet members with any fastening member, for example, and the way of binding of the sheet members is not limited especially. In some embodiments, the binding step deforms the stacked sheet members so that each sheet member has a recess on one face and has a protrusion on the other face as the binding part, and fits the protrusion of each sheet member into the recess of the adjacent sheet member.

This aspect deforms the stacked sheet members so that each of the stacked sheet members has a recess on one face and a protrusion on the other face. Such a binding part of each sheet member is made of an amorphous soft magnetic material, and so is less damaged.

In some embodiments, the preparing step prepares the sheet members each having a thickness of 0.01 mm or more and 0.05 mm or less. According to this aspect, the sheet members of the stator core each having a thickness of 0.01 mm or more and 0.05 mm or less also keep the mechanical strength of the stator core, and suppress iron loss of the stator core as well. Although thinner sheet members may be used to obtain smaller iron loss, sheet members with a thickness less than 0.01 mm are difficult to produce, and require a lot of cost and time for the manufacturing. Sheet members with a thickness exceeding 0.05 mm may have difficulty in sufficiently suppressing the iron loss of the stator core.

The motor according to the present disclosure enhances the strength of the stator core while improving the output from the motor. The method for manufacturing a motor according to the present disclosure enables easy manufacturing of a motor having such characteristics.

DETAILED DESCRIPTION

The following describes a first embodiment and a second embodiment of a motor according to the present disclosure, with reference to the drawings.

First Embodiment

1. Motor 1

Figure 1:
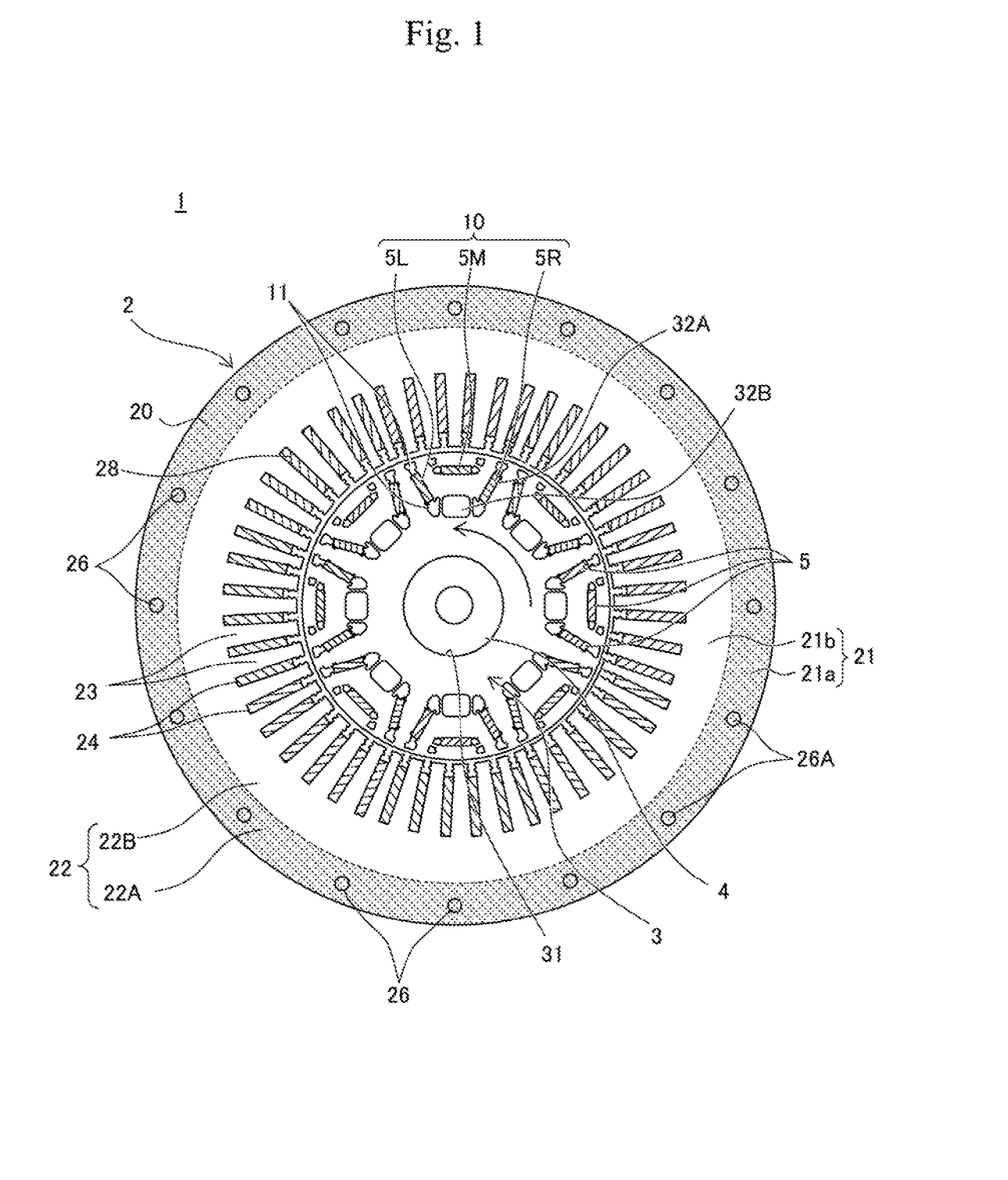
FIG. 1 is a plan view of one embodiment of a motor according to a first embodiment of the present disclosure.

A motor 1 according to the present embodiment shown in FIG. 1 is an IPM (interior permanent magnet) motor. The motor 1 operates as a drive source of a hybrid vehicle or an electric vehicle, for example. The motor 1 includes a stator 2 having a coil 28 wound therearound, and a rotor 3 rotatably disposed inside of the stator 2.

The stator 2 includes a stator core 20 and the coil 28. The stator core 20 includes an annular yoke (back yoke) 22 and a plurality of teeth 23, 23 . . . that extends inwardly from the yoke 22 (specifically toward the rotor 3).

The yoke 22 includes an annular outer part (outer yoke) 22A and an annular inner part (inner yoke) 22B that circles around inside of the outer part 22A. The teeth 23 extend inwardly (specifically toward the rotary shaft of the rotor 3) from the inner part 22B of the yoke 22. These teeth 23 are equally spaced in the circumferential direction of the yoke 22. The adjacent teeth 23, 23 define a slot 24 therebetween. The coil 28 is wound around these teeth 23, and the winding of the coil 28 is placed in these slots 24.

The coil 28 is disposed at the inner part of the stator 2 in the form of concentrated winding or distributed winding. Current flowing through the coil 28 generates magnetic field to rotate the rotor 3. In some embodiments, the inner part 22B of the yoke 22 is a part to form a magnetic path of this magnetic field, and the outer part 22A of the yoke 22 is a part not to form the magnetic path.

The stator core 20 includes the lamination of a plurality of sheet members 21, 21 . . . made of a soft magnetic material. The soft magnetic material in the present embodiment is any one of a nanocrystal soft magnetic material and an amorphous soft magnetic material. The sheet members 21, 21 . . . described later are prepared by using an amorphous soft magnetic material as a starting material, and crystallizing this into a nanocrystal soft magnetic material while leaving the amorphous soft magnetic member at a part of each of the sheet member 21. The thickness of each sheet member 21 is not limited especially. In some embodiments, the thickness is 0.01 mm or more and 0.05 mm or less, and such sheet members 21 are formed from metal foil. In some embodiments, thinner sheet members 21 are used because they lead to small iron loss of the stator core 20. Sheet members 21 with a thickness less than 0.01 mm, however, are difficult to produce, and require a lot of cost and time for the manufacturing. Sheet members 21 with a thickness exceeding 0.05 mm may have difficulty in sufficiently suppressing the iron loss of the stator core 20.

Figure 3A:
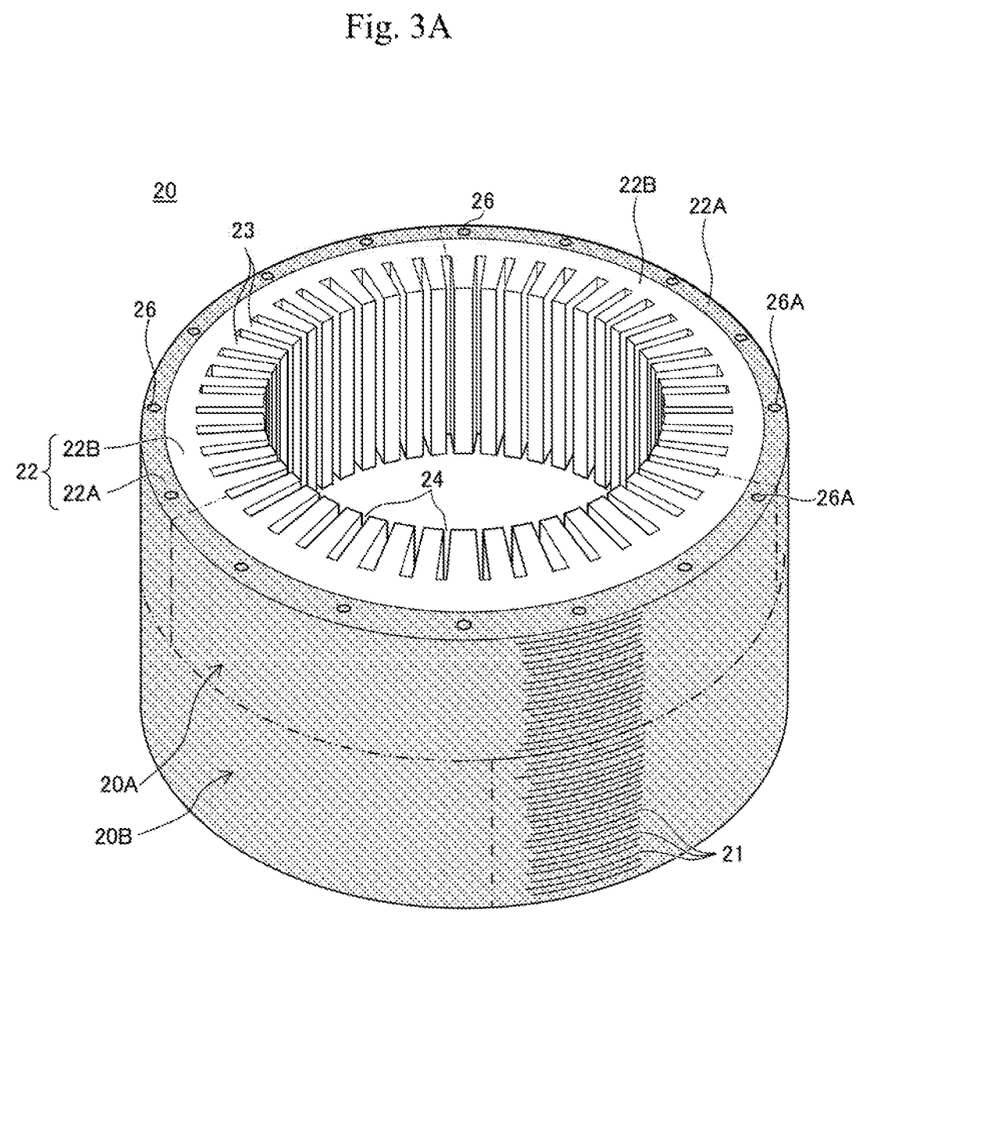
FIG. 3A is a schematic perspective view of the stator core in FIG. 1.
Figure 3B:
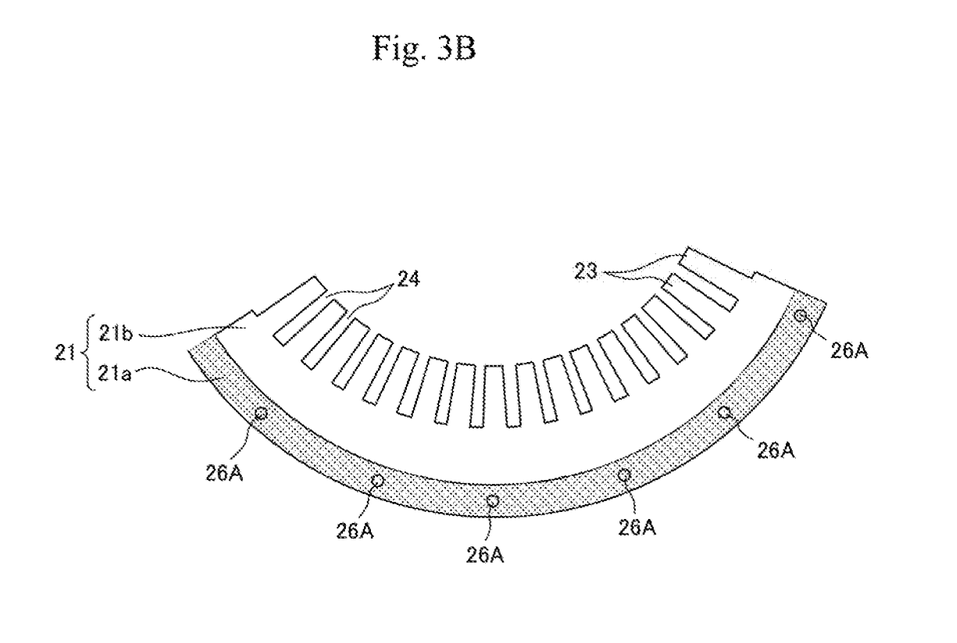
FIG. 3B is a plan view of a sheet member making up the stator core shown in FIG. 3A.

As described above, the stator 2 includes the annular-shaped stator core 20. As shown in FIG. 3A and FIG. 3B, the plurality of sheet members 21, 21 . . . making up the stator core 20 are divided into three sections at the locations having the center angle of 120° around the center axis of the stator core 20, for example. These divided three fan-shaped sheet members 21, 21 . . . are connected to form the annular shape.

The stator core 20 of the present embodiment includes a plurality of laminations 20A (20B) each including the plurality of fan-shaped sheet members 21, 21 . . . . These laminations 20A, 20A (20B, 20B) are disposed to form an annular shape, and then these laminations are fixed to each other.

The stator core 20 of the present embodiment includes two layers of the annular parts, including the annular part made up of three laminations 20A and the annular part made up of three laminations 20B. The number of these layers is not limited to two, which may be two or more. The sheet members 21 of the present embodiment are divided into three sections for the center angles of 120° around the center axis of the stator core 20. The number of division is not limited especially, and may be two or four or more. Like a second embodiment described later, these sheet members 21 may have a shape corresponding to the stator core 20 and a single sheet member 21 may be stacked to form a lamination.

Figure 3C:
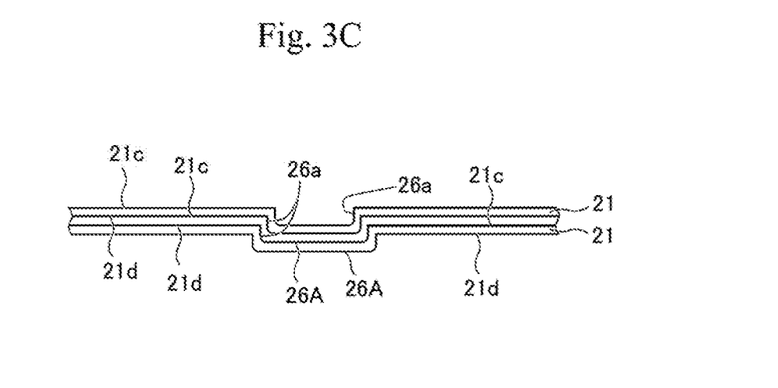
FIG. 3C is a cross-sectional view close to a binding part in FIG. 3B.

As shown in FIG. 3A to FIG. 3C, each sheet member 21 of the present embodiment includes a first part 21a and a second part 21b. The first part 21a corresponds to the outer part 22A of the yoke 22. The second part 21b is a part other than the first part 21a, and specifically corresponds to the inner part 22B of the yoke 22 and the teeth 23, 23 . . . .

As shown in FIG. 3B and FIG. 3C, each sheet member 21 of the present embodiment has a binding part 26 at the first part 21a to bind the stacked sheet members 21, 21. Specifically the binding part 26 of the present embodiment is a protrusion 26A, which is a part formed by swaging described later. The protrusion 26A is a deformed part of the stacked sheet members 21, 21 . . . to fix the sheet members 21, 21.

The protrusion 26A of the present embodiment has a recess 26a formed on one face 21c of each sheet member 21 so as to protrude from the other face 21d of the sheet member 21. The protrusion 26A of each sheet member 21 fits into the recess 26a of the adjacent sheet member 21 on the side of the other face 21d. This binds the adjacent sheet members 21 and 21.

The present embodiment has the binding part 26 for the stacked three sheet members 21 in one example, and stacks these bound sheet members 21 to form the lamination 20A or 20B. The number of the stacked sheet members 21 is not limited especially, as long as they can be bound with the binding part 26.

Each sheet member 21 of the present embodiment is made of an amorphous soft magnetic material at the first part 21a and is made of a nanocrystal soft magnetic material at the second part 21b. That is, the protrusion 26A as the binding part 26 of the present embodiment is made of the amorphous soft magnetic material. The first part 21a is made of the amorphous soft magnetic material, and so the soft magnetic material of the outer part 22A of the yoke 22 is the amorphous soft magnetic material. The second part 21b is made of the nanocrystal soft magnetic material, and so the soft magnetic material of the inner part 22B of the yoke 22 and the teeth 23, 23 . . . is the nanocrystal soft magnetic material. The detailed material characteristics of these parts are described later.

Figure 2:
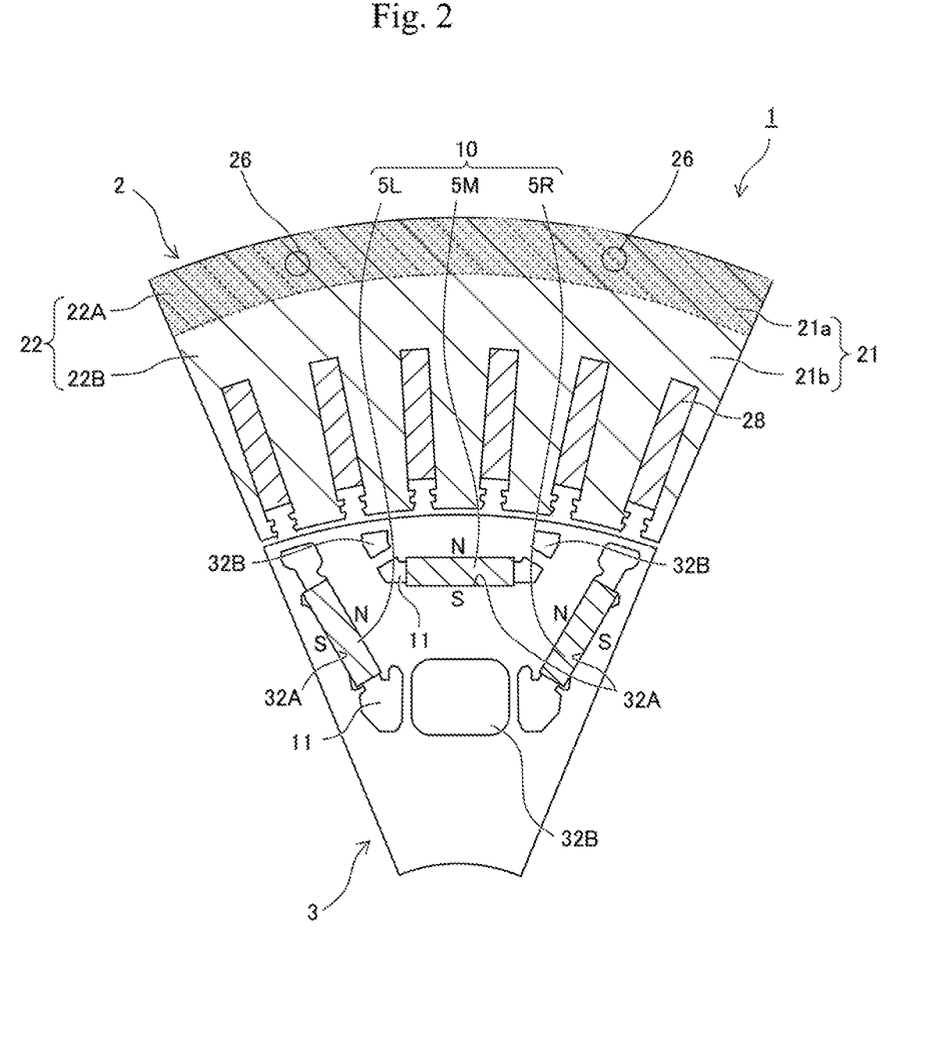
FIG. 2 is an enlarged cross-sectional view of a ⅛ model of the motor shown in FIG. 1 in the direction orthogonal to the rotary shaft.
Figure 4:
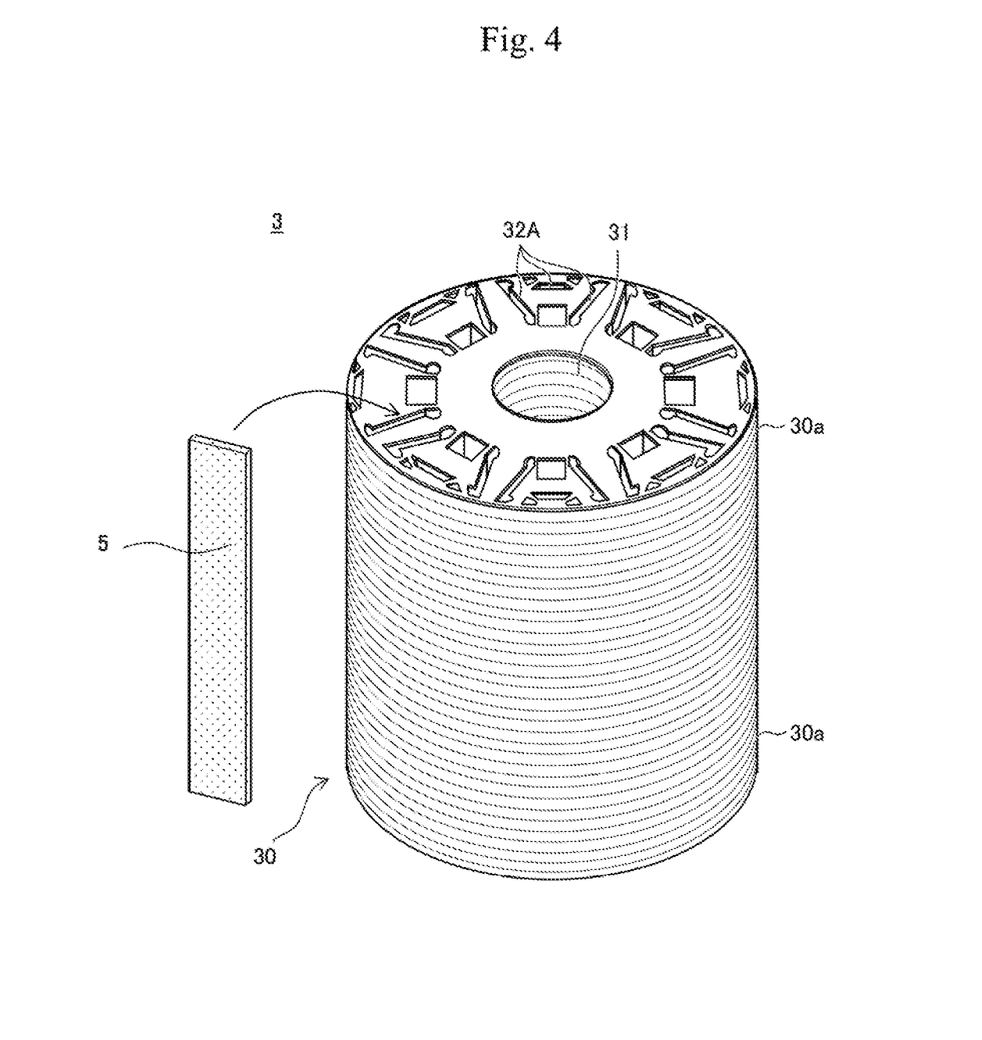
FIG. 4 is a schematic perspective view of insertion of a permanent magnet into the rotor shown in FIG. 1.

Referring to FIG. 1, FIG. 2 and FIG. 4, the following describes the rotor 3. The rotor 3 includes a rotor core 30, a rotary shaft 4 inserted into a shaft hole 31 at a center of the rotor core 30, and a plurality of magnets 5 (5L, 5M, 5R) embedded in a plurality of through-holes 32A in the rotor core 30. The rotary shaft 4 is made of metal. The rotary shaft 4 is inserted into the shaft hole 31 of the rotor core 30, and then is fixed to the rotor core 30 by swaging, for example. FIG. 1 and FIG. 2 omit the reference numeral 5, and the following collectively calls the magnets 5L, 5M and 5R as the magnet 5.

Each of the magnets 5 is a plate-like permanent magnet. As shown in FIG. 1 and FIG. 4, these magnets 5 are disposed in the rotating direction of the rotor 3 (the direction of the arrow in FIG. 1). Specifically as shown in FIG. 2, magnet groups 10 each consisting of a left magnet 5L, a middle magnet 5M, and a right magnet 5R are disposed at 45° intervals in the rotating direction of the rotor 3. Each magnet 5 is any one of the left magnet 5L, the middle magnet 5M, or the right magnet 5R. The left magnet 5L and the right magnet 5R on both sides of the middle magnet 5M refer to the illustrated positions of these magnets 5 for the purpose of illustration. That is, these magnets may include magnets 5 disposed on one side and on the other side of the middle magnet 5M.

In each of these magnet groups 10, the middle magnet 5M has the N-pole on the side adjacent to the stator 2 and the S-pole on the other side. The left magnet 5L and the right magnet 5R are disposed so that they have mutually reversed polarity of the adjacent magnetic poles of the middle magnet 5M. Specifically the left magnet 5L is closer to the S-pole of the middle magnet 5M than the N-pole, and so has the N-pole on the side adjacent to the middle magnet 5M. Similarly, the right magnet 5R is closer to the S-pole of the middle magnet 5M than the N-pole, and so has the N-pole on the side adjacent to the middle magnet 5M.

The rotor core 30 has a plurality of through-holes 32A and 32B. Each magnet 5 fits into a through-hole (magnet slot) 32A, and the through-hole 32A is filled with resin 11. For the resin 11, thermosetting resin having excellent formability and heat resistance is used. Examples of the thermosetting resin include epoxy resins and polyimide resins. Examples of the magnets 5 include rare-earth magnets, such as a neodymium magnet mainly containing neodymium, iron and boron, and a samarium-cobalt magnet mainly containing samarium and cobalt. Other examples include ferrite magnets and alnico magnets.

The rotor core 30 of the present embodiment is the laminate of a plurality of sheet members 30a made of a soft magnetic material that are stacked in the direction of the rotation axis of the rotor 3. In some embodiments, the soft magnetic material of the sheet members 30a is a nanocrystal soft magnetic material described later, and the thickness of each sheet member 30a is 0.01 mm or more and 0.05 mm or less. The rotor core 30 may be the lamination of magnetic steel sheets instead of the sheet members 30a.

The rotor core 30 may include an adhesive layer, such as heat-resistant resin, between the sheet members 30a. The rotor core may not have such an adhesive layer when it can keep the lamination. Examples of the heat-resistant resin include thermosetting resins. Examples of the thermosetting resins include epoxy resins, polyimide resins, polyamide-imide resins and acrylic resins.

The following describes an amorphous soft magnetic material and a nanocrystal soft magnetic material of the sheet members 21 of the stator core 20. Examples of the amorphous soft magnetic material and the nanocrystal soft magnetic material include, but are not limited to, a material including at least one type of magnetic metal selected from the group consisting of Fe, Co and Ni and at least one type of non-magnetic metal selected from the group consisting of B, C, P, Al, Si, Ti, V, Cr, Mn, Cu, Y, Zr, Nb, Mo, Hf, Ta and W.

Typical materials of the amorphous soft magnetic material and the nanocrystal soft magnetic material include, but are not limited to, FeCo alloys (e.g., FeCo and FeCoV), FeNi alloys (e.g., FeNi, FeNiMo, FeNiCr, and FeNiSi), FeAl alloys or FeSi alloys (e.g., FeAl, FeAlSi, FeAlSiCr, FeAl-SiTiRu, and FeAlO), FeTa alloys (e.g., FeTa, FeTaC, and FeTaN) and FeZr alloys (e.g., FeZrN). In some embodiments, the Fe alloy includes 80at % or more of Fe.

Other materials of the amorphous soft magnetic material and the nanocrystal soft magnetic material include Co alloys including Co and at least one type of Zr, Hf, Nb, Ta, Ti and Y. In some embodiments, the Co alloy includes 80at% or more of Co. Such a Co alloy easily forms amorphous in the film, which has less crystal magnetic anisotropy, less crystal defects and less grain boundary, and so shows a very excellent soft magnetic property. In some embodiments, the amorphous soft magnetic material may be CoZr, CoZrNb, or CoZrTa alloys.

The amorphous soft magnetic material in this description is a soft magnetic material having an amorphous structure as the major structure. The amorphous structure does not have a clear peak in the X-ray diffraction pattern, and shows a broad halo pattern only. The heat-treated amorphous structure may form a nanocrystal structure, and a nanocrystal soft magnetic material having a nanocrystal structure shows diffraction peaks at the positions corresponding to the lattice spacing of the crystal face. The crystallite diameter can be calculated from the width of the diffraction peak by the Scherrer's equation.

Nanocrystal soft magnetic materials in this description include nanocrystals having the crystallite diameter calculated by the Scherrer's equation based on the half width of the diffraction peak of the X-ray diffraction that is less than 1 μm. In the present embodiment, the crystallite diameter of nanocrystals, which is calculated by the Scherrer's equation based on the half width of the diffraction peak of the X-ray diffraction, may be 100 nm or less and may be 50 nm or less. In some embodiments, the crystallite diameter of nanocrystals is 5 nm or more. Such a size of the crystallite diameter of nanocrystals improves the magnetic characteristics. Note here that conventional magnetic steel sheets have a crystallite diameter in the order of μm, typically 50 μm or more.

Figure 10A:
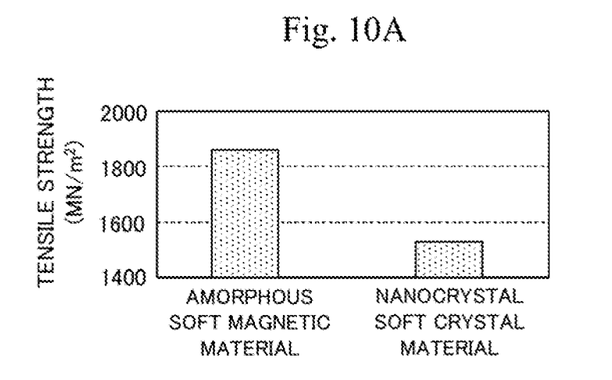
FIG. 10A is a graph showing the tensile strength of an amorphous soft magnetic material and the tensile strength of a nanocrystal soft magnetic material.
Figure 10B:
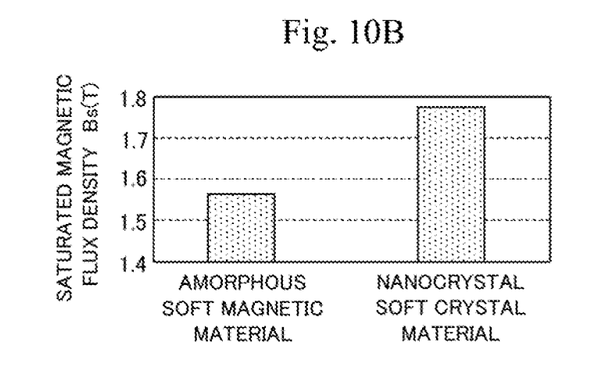
FIG. 10B is a graph showing the saturated magnetic flux density of an amorphous soft magnetic material and the saturated magnetic flux density of a nanocrystal soft magnetic material.

As is clear from the result of FIG. 10A described later, amorphous soft magnetic materials have a tensile strength higher than that of nanocrystal soft magnetic materials. Amorphous soft magnetic materials have saturated magnetic flux density lower than that of nanocrystal soft magnetic materials. Considering these points, the motor 1 of the present embodiment has the following advantageous effects.

The stator core 20 according to the present embodiment includes the lamination of a plurality of sheet members 21, 21 . . . The binding part 26 that binds these sheet members 21, 21 is receptive to stress, such as thermal stress, during the operation of the motor 1. Especially the binding part 26 of the present embodiment is a protrusion 26A, and such a protrusion 26A is more receptive to stress. The binding part 26 (protrusion 26A) of the present embodiment is made of an amorphous soft magnetic material that has a higher mechanical strength than that of a nanocrystal soft magnetic material, and in the case of concentration of stress on the binding part 26 (protrusion 26A), if any, this configuration prevents a breakage originating from the binding part 26 (protrusion 26A).

Especially the first part 21a having the protrusion 26A of the present embodiment corresponds to the outer part 22A of the yoke 22, and this first part 21a is made of an amorphous soft magnetic material. This means that the mechanically strong material is disposed at the outer part of the annular stator core 20, and this increases the rigidity of the stator core 20.

In the present embodiment, the first part 21a as a whole including the binding part 26 (protrusion 26A) is made of an amorphous soft magnetic material. In another embodiment, the binding part 26 (protrusion 26A) only may be made of an amorphous soft magnetic material. In this case, the first part 21a other than the binding part 26 (protrusion 26A) and the second part 21b are made of a nanocrystal soft magnetic material.

The second part 21b is a part of the sheet member 21 other than the first part 21a, and so corresponds to the inner part 22B of the yoke 22 and the teeth 23, 23 . . . to form a magnetic path during the operation of the motor 1. The second part 21b is made of a nanocrystal soft magnetic material having higher saturated magnetization than that of an amorphous soft magnetic material, and so the output characteristics of the motor 1 improve. The rotor core 30 may include the lamination of a plurality of sheet members 30a made of a nanocrystal soft magnetic material, and the output characteristics of such a motor 1 improve more.

2. Method for Manufacturing Motor 1

Figure 5:
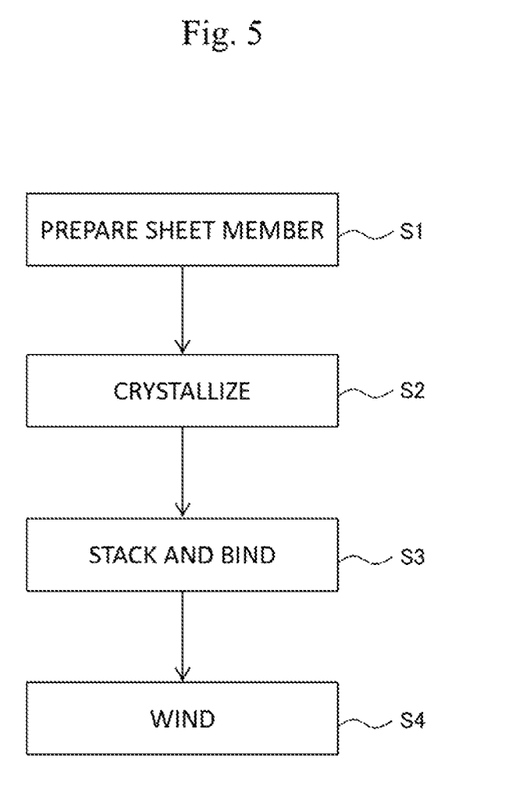
FIG. 5 is a flowchart of a method for manufacturing a motor according to the present embodiment.

Referring to the flowchart of FIG. 5, the following describes a method for manufacturing the motor 1 (specifically a method for manufacturing the stator core 20).

2-1. Preparation of Sheet Member at Step S1

The method firstly prepares a sheet member 21 to make up the stator core 20 of the stator 2. The sheet member 21 is made of an amorphous soft magnetic material. The sheet member 21 has a shape corresponding to the shape of the stator core 20 in a cross section orthogonal to the rotary axis of the rotor 3. The sheet member 21 in the present embodiment has a fan-like shape.

The amorphous soft magnetic material may be prepared by mixing metal raw materials that are blended to have the above-stated composition and melting the metal raw materials at a high temperature in a high-frequency melting furnace, for example, to be a homogeneous molten metal, and then quenching the molten metal. The quenching rate depends on the material, which may be about $10^{6°}$ C./sec, for example. The quenching rate is not limited especially as long as it forms the amorphous structure before crystallization. The method of the present embodiment forms the sheet member 21 by spraying the molten metal of the metal raw materials on a rotating cooled roll to prepare a metal foil belt of an amorphous soft magnetic material, and by press-forming the metal foil belt to have a shape corresponding to the shape of the stator core 20 (shape of the sheet member 21). In this way, quenching of the molten metal manufactures an amorphous-structured soft magnetic material before the crystallization. In some embodiments, the thickness of the sheet members 21 is 0.01 mm or more and 0.05 mm or less.

2-2. Crystallization at Step S2

At this step, the method heat-treats the prepared sheet member 21 to crystallize the material of the sheet member 21. The method of the present embodiment firstly sets the binding part 26 of the sheet member 21 that binds the stacked sheet members 21 and 21 at the first part 21a corresponding to the outer part 22A of the yoke 22. At this step, the set binding part 26 is not deformed as the protrusion 26A, and the present embodiment sets the binding part 26 at the first part 21a as a whole.

Next the method heats the second part 21b of the sheet member 21 (the part other than the first part 21a) while keeping the amorphous soft magnetic material of the first part 21a including such a set binding part 26. This crystallizes (alters) the second part 21b from the amorphous soft magnetic material into a nanocrystal soft magnetic material. That is, this step changes the amorphous structure of the soft magnetic material at the second part 21b into the nanocrystal structure by heating, while keeping the amorphous structure of the soft magnetic material at the first part 21a.

Figure 6:
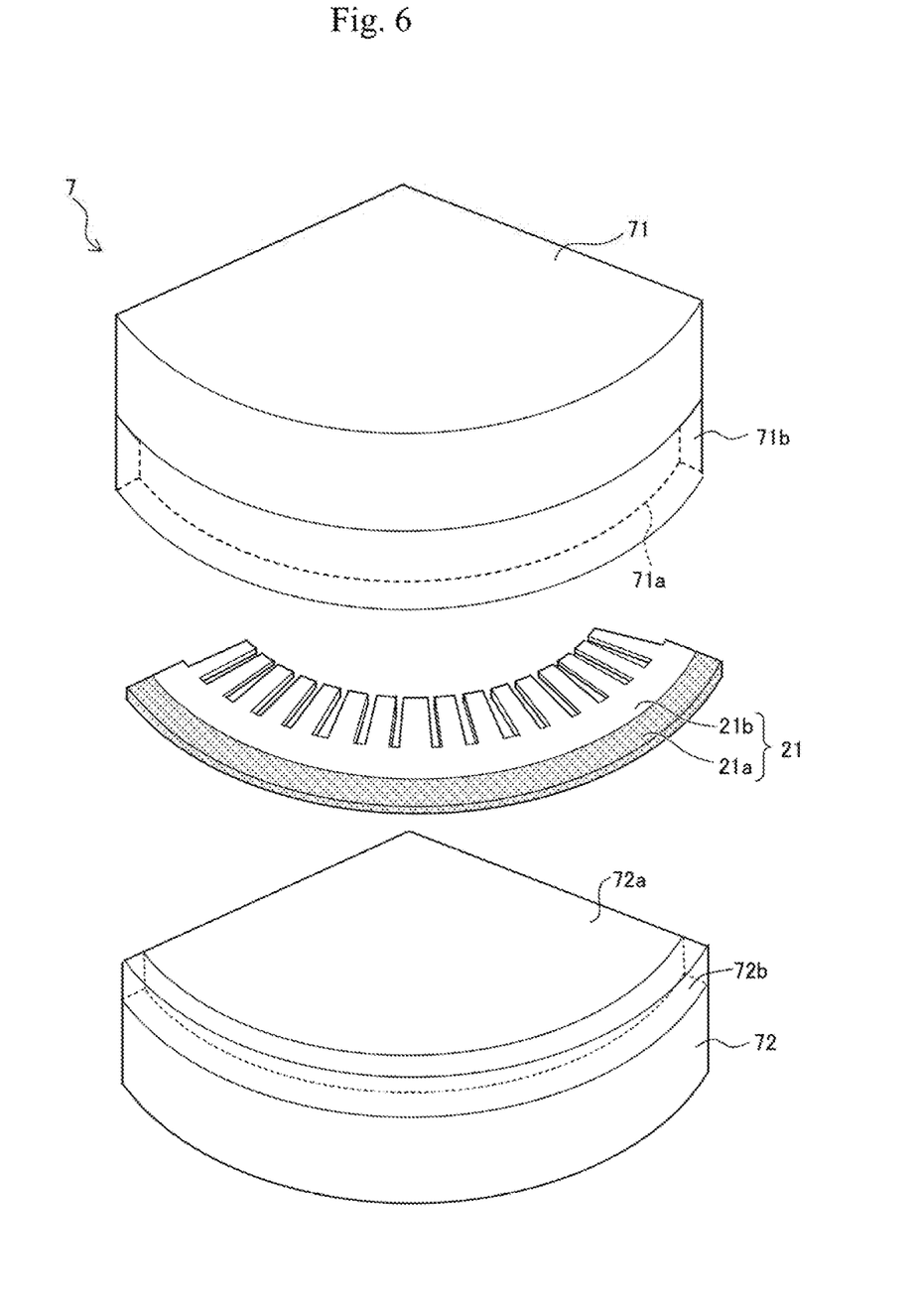
FIG. 6 is a schematic perspective view to explain the crystallization step in FIG. 5.

Specifically as shown in FIG. 6, this step places the prepared sheet member 21 between a pair of dies 71 and 72 of a heating device 7 so as to partially heat the sheet member 21. The pair of dies 71 and 72 of the present embodiment includes heating blocks 71a and 72a including a heater to come in contact with the second part 21b of the sheet member 21 and heat the second part 21b, and cooling blocks 71b and 72b to flow refrigerant to come in contact with the first part 21a of the sheet member 21 and cool the first part 21a. The structure of these dies 71 and 72 is not limited especially as long as the first part 21a is not crystallized with the heat to heat the second part 21b.

The crystallization step S2 brings the heating blocks 71a and 72a into contact with the second part 21b to heat the second part 21b. This crystallizes the second part 21b from the amorphous soft magnetic material into the nanocrystal soft magnetic material. The first part 21a is in contact with the cooling blocks 71b and 72b, and is less affected from the heating with the heating block 71a and 72a. This suppresses crystallization of the amorphous soft magnetic material at the first part 21a and keeps the amorphous soft magnetic material there.

The conditions of the heat treatment of the second part 21b of the sheet member 21 are not limited especially as long as the material is crystalized, and may be selected as appropriate while considering the composition of the metal raw materials or the magnetic property to be achieved. The temperature of the heat treatment by the heating device is not limited especially, and the temperature is higher than the crystallization temperature of the soft magnetic material of the sheet member 21, for example. This changes the amorphous soft magnetic material into the nanocrystal soft magnetic material through the heat treatment. In some embodiments, the heat treatment is performed under an inert gas atmosphere.

The crystallization temperature causes crystallization of a material. Since crystallization involves an exothermic reaction, the crystallization temperature can be determined by measuring the temperature of heat generation involved in the crystallization. For instance, the crystallization temperature may be measured by differential scanning calorimetry (DSC) under the condition of a predetermined heating rate (e.g., 0.67 $Ks^{-1}$). The crystallization temperature depends on amorphous soft magnetic materials, which may range from 300 to 500° C., for example. Similarly the crystallization temperature of a nanocrystal soft magnetic material also can be measured by differential scanning calorimetry (DSC). Nanocrystal soft magnetic materials, which already have crystals, may be heated at the crystallization temperature or higher to cause further crystallization. The crystallization temperature depends on nanocrystal soft magnetic materials, which may range from 300 to 500° C., for example.

The first part 21a has to be kept as the amorphous soft magnetic material after the crystallization step S2. To this end, the temperature of the first part 21a during heating of the second part 21b is 0° C. to 200° C., and 20° C. to 150° C. in some embodiments. The crystallization step S2 of the present embodiment cools the first part 21a with the cooling blocks 71b and 72b. In another embodiment, a pair of dies may have a release (recess) that does not come in contact with the first part 21a so as to avoid direct heating of the first part 21a with the heating blocks 71a and 72a.

The heating temperature at this step is not limited especially as long as it is the crystallization temperature or higher from the amorphous soft magnetic material to a nanocrystal soft magnetic material. The temperature may be 350° C. or higher, and may be 400° C. or higher in some embodiments. The heating temperature at 400° C. or higher progress the crystallization efficiently. The heating temperature may be 600° C. or lower in one example, and in some embodiments, the temperature may be 520° C. or lower. The heating temperature at 520° C. or lower prevents excessive crystallization, and suppresses the generation of by-products (e.g., $Fe_2B$).

The heating duration for the heat treatment is not limited especially. In some embodiments, the duration is 1 second or longer and 10 minutes or shorter, and is 1 second or longer and 5 minutes or shorter.

2-3. Stacking and Binding at Step S3

Figure 7A:
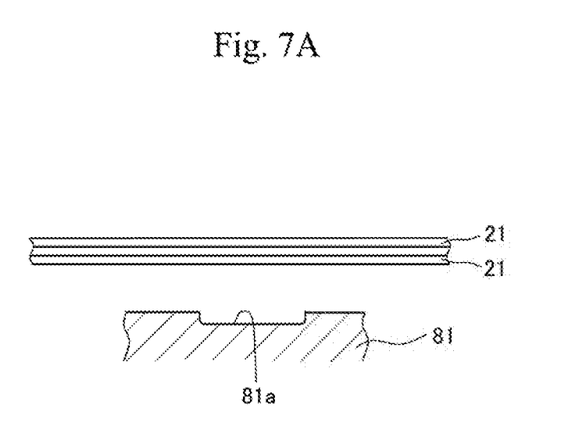
FIG. 7A is a schematic cross-sectional view to explain stacking of the sheet members in the stacking/binding step in FIG. 5.
Figure 7B:
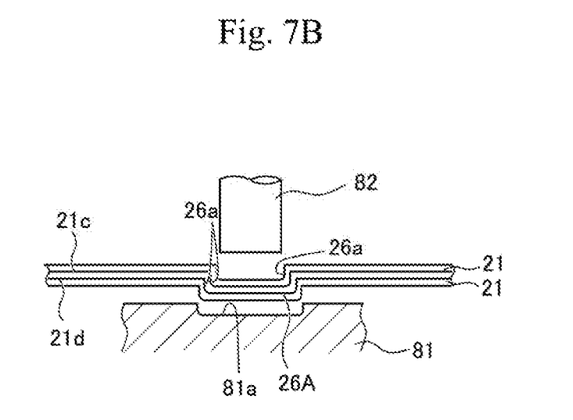
FIG. 7B is a schematic cross-sectional view to explain binding of the sheet members in the stacking/binding step in FIG. 5.

Next the method performs stacking and binding step S3. At this step, as shown in FIG. 7A, the method stacks the sheet members 21 after crystallization S2 in the thickness direction of the sheet members 21. Next as shown in FIG. 7B, the method forms a protrusion 26A as the binding part 26 in the sheet members 21 by swaging to fix the sheet members 21, 21. Specifically as shown in FIG. 7A, the method places the plurality of stacked sheet members 21, 21 . . . on a mount 81 having a recess 81a. Next as shown in FIG. 7B, the method moves a pin 82 toward the mount 81 to press the sheet members 21, 21 . . . .

This pressing deforms the stacked sheet members 21, 21 so that each of the stacked sheet members 21, 21 . . . has a recess 26a on one face 21c and a protrusion 26A on the other face 21d. This displacement fits the protrusions 26A of each of the sheet members 21, 21 into the corresponding recesses 26a of the adjacent sheet member 21. In this way the stacked sheet members 21, 21 are bound with the protrusion 26A. The method manufactures a plurality of the laminations, each including a plurality of sheet members 21, 21 . . . fixed with the protrusion 26A, and stacks these laminations and fixes them by swaging as stated above or with resin to prepare the laminations 20A and 20B shown in FIG. 3A. The method then disposes the laminations 20A and 20B as shown in FIG. 3A and fixes them with resin, for example, to obtain the stator core 20. After manufacturing the stator core 20, the winding step S4 winds the coil 28 around the teeth 23 to obtain the stator 2.

The present embodiment binds the sheet members 21, 21 with the protrusion 26A. In another embodiment, resin may be placed between the sheet members 21, 21 to bind these sheet members 21, 21. In this case, the first part 21a of each sheet member 21 that is in contact with the resin functions as the binding part.

The manufacturing method of the present embodiment stacks the plurality of sheet members 21, 21 as the stator core 20, and binds the sheet members 21, 21 with the binding part 26 (protrusion 26A) at the stacking and binding step S3. Although such a binding part 26 is receptive to stress, the crystallization step S4 keeps the amorphous soft magnetic material of the binding part 26 that has a higher mechanical strength than that of a nanocrystal soft magnetic material.

This prevents damage of the sheet members 21 during binding of the sheet members 21, 21 with the binding part 26 at the binding step S3. Especially although the present embodiment deforms the sheet members 21 to have the protrusion 26A as the binding part 26, the configuration of the present embodiment suppresses damage at the protrusion 26A. Additionally the first part 21a of the present embodiment corresponding to the outer part 22A of the yoke 22 is made of the amorphous soft magnetic material, and so the outer part 22A of the annular stator core 20 has an improved mechanical strength. This improves the rigidity of the stator core 20.

The second part 21b corresponds to the inner part 22B of the yoke 22 and the teeth 23, 23 . . . where a magnetic path is formed during the operation of the motor 1 as stated above. The crystallization step S2 of the present embodiment heats the second part 21b of each sheet member 21 to crystallize this part from the amorphous soft magnetic material to a nanocrystal soft magnetic material. In this way the second part 21b is made of a nanocrystal soft magnetic material having higher saturated magnetization than that of an amorphous soft magnetic material, and this allows magnetic flux generated at the coil C to easily flow toward the teeth 23. As a result the output characteristics of the motor 1 improve.

Second Embodiment

Figure 8A:
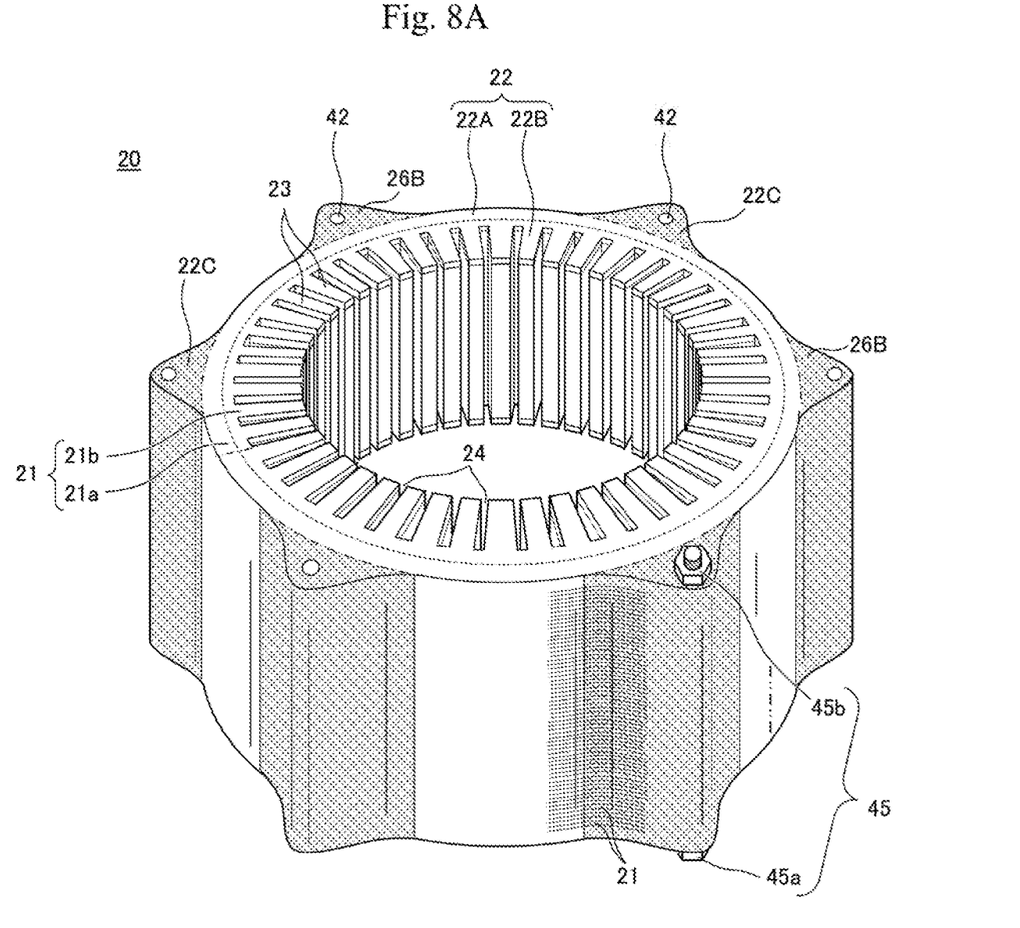
FIG. 8A is a schematic perspective view showing a stator core in a motor according to a second embodiment of the present disclosure.
Figure 8B:
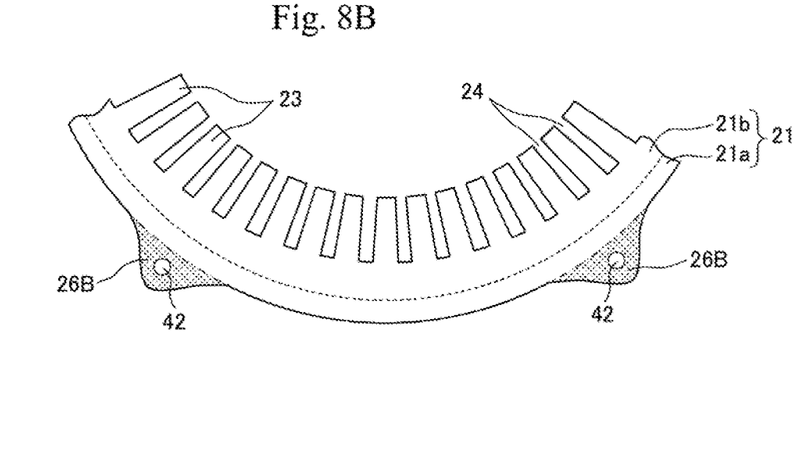
FIG. 8B is a plan view of a part of a sheet member making up the stator core shown in FIG. 8A.

Referring to FIG. 8A and FIG. 8B, the following describes a motor according to a second embodiment of the present disclosure. The motor of this embodiment is different from the above-described embodiment in the shape of the stator core 20 and the sheet member 21 and in the binding part 26. In the following description, like reference numerals designate like parts of the embodiment as stated above, and their description is omitted.

The outer part 22A of the yoke 22 in the stator core 20 as a part of the stator 2 has attachments 22C with attachment holes 42 to attach the stator core 20 to a housing (not shown), for example. The stator core 2 is the lamination of the sheet members 21. Unlike the first embodiment, each sheet member 21 of the present embodiment is not divided, and has an annular shape corresponding to the shape of the stator core 20. FIG. 8B is a plan view of a part of the sheet member 21. A binding part 26B of the sheet member 21 in the present embodiment corresponds to the attachment 22C.

As shown in FIG. 8A, the present embodiment binds the plurality of stacked sheet members 21, 21 . . . with a fastener 45 including an external screw 45a and an internal screw 45b. Specifically the present embodiment stacks the plurality of sheet members 21, 21 . . . , and then as shown in FIG. 8A, inserts the external screw 45a, such as a bolt, into the attachment hole 42 and pinches the plurality of stacked sheet members 21, 21 . . . between the head of the external screw 45a and the internal screw 45b, such as a nut, screwing with the shaft of the external screw 45a. FIG. 8A shows only one position of the stacked sheet members 21, 21 . . . bound with the faster 45, and a part or all of the other positions may be bound. In this way the sheet members 21, 21 are bound with the binding part 26B. The present embodiment binds the stacked sheet members 21, 21 with the fastener 45. In another embodiment, the plurality of stacked sheet members 21, 21 may be bound with a holding member, such as a clip.

Similarly to the first embodiment, the binding part 26B is disposed at the first part 21a corresponding to the outer part 22A of the yoke 22. As stated above, this binding part 26B binds the sheet members 21, 21 with the fastener 45. In the present embodiment, the binding part 26B of the first part 21a is made of an amorphous soft magnetic material, and a part of the first part 21a other than the binding part 26B and the second part 21b are made of a nanocrystal soft magnetic material. In this way the binding part 26B is made of an amorphous soft magnetic material having a mechanical strength higher than that of a nanocrystal soft magnetic material, and the attachments 22C, which are receptive to stress from the fastener 45, have an improved mechanical strength.

In the present embodiment, only the binding part 26B is made of an amorphous soft magnetic material. In another embodiment, the first part 21a may be made of an amorphous soft magnetic material. In this case, the outer part of the stator core 20 is made of the amorphous soft magnetic material, and the rigidity of the stator core 20 improves.

Similarly to the first embodiment, the stator core 20 of the present embodiment may be manufactured by preparing sheet members made of an amorphous soft magnetic material, and partially heating a part other than the binding part 26B at the crystallization step to crystallize the heated part into a nanocrystal soft magnetic material. After the crystallization step, the method then stacks these sheet members, and fixes them at the binding part 26B to obtain the stator core.

EXAMPLES

Motors in Example according to the present disclosure, and in Comparative Examples 1 and 2 and Reference Example were prepared, and the torque (maximum torque) of these motors was analyzed as follows.

Example

An analysis model shown in FIG. 2 was manufactured. As shown in Table 1, the outer part (first part) of the yoke in the stator core had a physical property value of an amorphous soft magnetic material, and the inner part of the yoke and the teeth (second part) had a physical property value of a nanocrystal soft magnetic material. The rotor core had a physical property value of a nanocrystal soft magnetic material. Note here that the physical property values of the amorphous soft magnetic material and the nanocrystal soft magnetic material used for this analysis model were measured beforehand. FIG. 11A shows the tensile strength of the amorphous soft magnetic material and the nanocrystal soft magnetic material, and FIG. 11B shows the saturated magnetic flux density of the amorphous soft magnetic material and the nanocrystal soft magnetic material.

TABLE 1

| | | EX. | COMP. EX. 1 | COMP. EX. 2 | REF. EX. |
|---|---|---|---|---|---|
| STATOR CORE | 1st PART | AMORPHOUS | AMORPHOUS | AMORPHOUS | NANOCRYSTAL |
| | 2nd PART | NANOCRYSTAL | AMORPHOUS | AMORPHOUS | NANOCRYSTAL |
| ROTOR CORE | | NANOCRYSTAL | AMORPHOUS | NANOCRYSTAL | NANOCRYSTAL |

Comparative Example 1

An analysis model was manufactured similarly to Example. This Comparative Example was different from Example in that the stator core as a whole had a physical property value of an amorphous soft magnetic material as shown in Table 1. This means that the outer part (first part) of the yoke and the inner part of the yoke and the teeth (second part) had a physical property value of an amorphous soft magnetic material. Another difference from Example was the rotor core having a physical property value of an amorphous soft magnetic material.

Comparative Example 2

An analysis model was manufactured similarly to Example. This Comparative Example was different from Example in that the stator core as a whole had a physical property value of an amorphous soft magnetic material as shown in Table 1.

Reference Example

An analysis model was manufactured similarly to Example. This Reference Example was different from Example in that the stator core as a whole had a physical property value of a nanocrystal soft magnetic material as shown in Table 1. This means that the outer part (first part) of the yoke and the inner part of the yoke and the teeth (second part) had a physical property value of a nanocrystal soft magnetic material. The rotor core had a physical property of a nanocrystal soft magnetic material.

Figure 9:
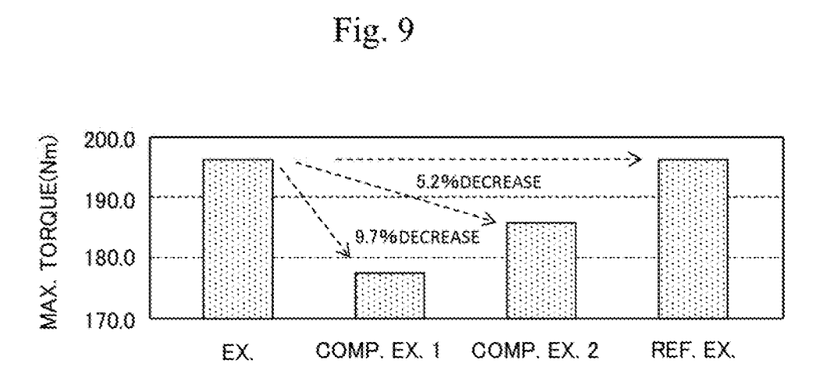
FIG. 9 is a graph showing the result of the maximum torques from the motors according to the analysis models of Example, Comparative Examples 1 and 2, and Reference Example.

Based on these analysis models of Example, Comparative Examples 1 and 2, and Reference Example, the torque (maximum torque) of these motors was calculated. FIG. 9 shows the result. The maximum torque of the motor of Example was larger than those in Comparative Examples 1 and 2, and was similar to that of Reference Example.

This result shows that Example, having the second part of the stator core made of a nanocrystal soft magnetic material having saturated magnetization higher than that of an amorphous soft magnetic material, had the torque larger than those of Comparative Examples 1 and 2, and similar to that of Reference Example.

Example had the first part made of an amorphous soft magnetic material having a mechanical strength higher than that of a nanocrystal soft magnetic material. Stacking of these sheet members while binding them at this first part achieves a durable motor as compared with Reference Example.

That is a detailed description of the embodiments of the present disclosure. The present disclosure is not limited to the above-stated embodiments, and the design may be modified variously without departing from the spirits of the present disclosure.

Example shows the rotator core made of an amorphous soft magnetic material or a nanocrystal soft magnetic material. In another example, the rotor core may be made of a magnetic material, such as a magnetic steel sheet. The rotor is not limited to an IPM motor, and may be a directly magnetized rotor.

What is claimed is:

1. A motor comprising:
    a stator including a stator core including an annular yoke having an outer part and an inner part and teeth extending inwardly from the inner part of the yoke, and a coil wound around the teeth; and
    a rotor rotatably disposed inside of the stator,
    the stator core including a lamination of a plurality of sheet members made of a soft magnetic material,
    each of the sheet members having a binding part to bind the sheet members in the lamination at a first part corresponding to the outer part of the yoke,
    at least the binding part of the first part being made of an amorphous soft magnetic material,
    the sheet member having a second part other than the first part, the second part being made of a nanocrystal soft magnetic material.

2. The motor according to claim 1, wherein the first part includes an amorphous soft magnetic material.

3. The motor according to claim 1, wherein each of the sheet members has a recess on one face, the binding part is a protrusion on the other face defined with the recess, and the protrusion of each sheet member fits into the recess of the adjacent sheet member.

4. The motor according to claim 1, wherein each of the sheet members has a thickness of 0.01 mm or more and 0.05 mm or less.

* * * * *